(12) United States Patent
Kruzelecky et al.

(10) Patent No.: US 7,761,053 B2
(45) Date of Patent: Jul. 20, 2010

(54) VARIABLE EMITTANCE THERMOCHROMIC MATERIAL AND SATELLITE SYSTEM

(75) Inventors: Roman V. Kruzelecky, Beaconsfield (CA); Emile Haddad, Montréal (CA); Brian Wong, Montréal (CA); Wes R. Jamroz, Montréal (CA)

(73) Assignee: MPB Communications Inc., Montreal, Quebec (CA)

( * ) Notice: Subject to any disclaimer, the term of this patent is extended or adjusted under 35 U.S.C. 154(b) by 985 days.

(21) Appl. No.: 11/530,086

(22) Filed: Sep. 8, 2006

(65) Prior Publication Data
US 2009/0253369 A1 Oct. 8, 2009

(51) Int. Cl.
*H04B 7/185* (2006.01)
*H04B 1/38* (2006.01)
*B32B 3/00* (2006.01)
*B32B 7/10* (2006.01)
*B32B 5/16* (2006.01)
*B32B 9/00* (2006.01)
*G02F 1/15* (2006.01)
*G02F 1/07* (2006.01)
*G02F 1/153* (2006.01)

(52) U.S. Cl. ............ 455/12.1; 455/90.3; 428/173; 428/201; 428/208; 428/469; 359/265; 359/266; 359/267; 359/269

(58) Field of Classification Search ............ 359/265, 359/266, 267, 269; 455/12.1, 90.3; 428/173, 428/201, 208, 469
See application file for complete search history.

(56) References Cited

U.S. PATENT DOCUMENTS 3,483,110 A 12/1969 Rozgonyi
3,565,671 A 2/1971 Teeg et al.
3,871,902 A * 3/1975 Leinkram et al. ............ 427/295
4,393,095 A 7/1983 Greenberg (Continued)

OTHER PUBLICATIONS

Satellite Thermal Control Handbook, David G. Gilmore (editor), The Aerospace Corporation Press, El Segundo, California, 1994, pp. 4-99 through 4-103.

(Continued)

*Primary Examiner*—Matthew D Anderson
*Assistant Examiner*—Bobbak Safaipour
(74) *Attorney, Agent, or Firm*—Angelhart et al.

(57) ABSTRACT

The emittance value is a measure of an amount of energy expelled from a given surface area relative to a black-body reference. Depending on the specific coating a change in the emittance value is actively or passively effected. There are known active variable emittance thermal control coatings. However, such coatings are actually panels housing a mixture of both high and low emissivity materials that are electrically manipulated to control the emittance value of the panel. These "coatings" are classified as either electrochromic or electrophorectic. Both electrochromic and electrophorectic coatings require an applied voltage to cause a change in the emittance value of the coating. By contrast, aspects of the present invention do not include active variable emittance thermal control coatings. Aspects of the present invention do include passive variable emittance thermal control coatings and materials. In accordance with aspects of the present invention "passive" means that the variable emittance value changes in response to changes in the environment without active control (e.g. neither a voltage nor a current is applied). More specifically, in accordance with one aspect of the invention a passive variable emittance thermochromic material is provided that has a relatively low emittance value at low temperatures and a relatively high emittance value at high temperatures.

19 Claims, 8 Drawing Sheets

U.S. PATENT DOCUMENTS

| | | | |
|---|---|---|---|
| 4,401,690 A | 8/1983 | Greenberg | |
| 5,876,856 A * | 3/1999 | Long | 428/446 |
| 6,440,592 B1 | 8/2002 | Meyer et al. | |
| 6,538,796 B1 | 3/2003 | Swanson | |
| 6,872,453 B2 | 3/2005 | Arnaud et al. | |
| 6,906,842 B2 * | 6/2005 | Agrawal et al. | 359/265 |
| 7,691,435 B2 * | 4/2010 | Keller et al. | 427/162 |
| 2002/0041443 A1 * | 4/2002 | Varaprasad et al. | 359/603 |
| 2003/0227664 A1 * | 12/2003 | Agrawal et al. | 359/269 |
| 2004/0155154 A1 * | 8/2004 | Topping | 244/158 R |
| 2005/0147825 A1 | 7/2005 | Arnaud et al. | |
| 2005/0270960 A1 | 12/2005 | Meinders | |
| 2008/0038454 A1 * | 2/2008 | Keller et al. | 427/162 |

OTHER PUBLICATIONS

Mahan B.A., University Chemistry, 3rd Edition, Addison-Wesley Publishing, 685-743, 1975.

* cited by examiner

VARIABLE EMITTANCE THERMOCHROMIC MATERIAL AND SATELLITE SYSTEM

FIELD OF THE INVENTION

The invention relates to materials with variable emittance, and, in particular to variable emittance thermochromic materials and devices.

BACKGROUND OF THE INVENTION

The presence and absence of solar energy has the potential to respectively raise and lower the internal temperature of a structure or housing. These effects are felt terrestrially in buildings and in vehicles over the course of a day, week or month. However, for spacecrafts outside the protection of the atmosphere heating and cooling can happen significantly faster and over a wider range of temperatures ranging from below −150° C. to above +150° C. in a matter of minutes. Internal temperature regulation is required to maintain a suitable operating environment for spacecraft subsystems. For example, it is preferable to maintain the internal temperature of a satellite in the approximate range of −10° C. to +30° C. to ensure effective operation of communication and control electronics, such as transceivers and processors. The aforementioned rapid and expansive external temperature swings must be accounted for when designing systems and devices for controlling the internal temperature of a spacecraft.

While smaller spacecraft are seen as one way in which current and future space science goals may be reached, the relatively low mass of such spacecrafts complicates the problem of temperature regulation. The relatively low mass of these spacecrafts means that they also have relatively low thermal capacitance, which makes them especially susceptible to wide temperature swings. Accordingly, thermal control is seen as increasingly important for smaller spacecrafts. However, smaller spacecrafts typically have short design cycles and are expected to be cost effective. Consequently, there is limited space and weight provided for temperature regulators such as heaters and thermal radiators.

Most spacecrafts rely on passive radiative surfaces to dissipate excess heat through thermal radiation into dark space. These types of passive thermal management systems typically employ thermal radiators that are sized for maximum power dissipation requirements. The thermal radiators typically include a coating with a fixed thermal emissivity value that is selected as a tradeoff between efficient heat dissipation at upper temperatures and sufficient heat retention at low temperatures.

In contrast active thermal management systems include some combination of electro-mechanical systems, heating and cooling pipes and/or voltage controlled variable emittance panels applied over thermal radiators. There are a number of problems associated with active thermal management systems including cost, complexity, size, weight, redundancy and the risk of catastrophic damage. The risk of catastrophic damage is exceptional in that such damage would occur in outer space where a satellite cannot easily be fixed, if at all. Thus, damage to an active thermal management system of a satellite may mean that the entire satellite is rendered inoperable.

SUMMARY OF THE INVENTION

According to an aspect of an embodiment of the invention there is provided a variable emittance thermochromic material including: spatially isolated particles, wherein the particles are of a transition metal based complex having temperature dependent properties including a range of non-metallic properties at relatively low temperatures including low emittance, a range of metallic properties at relatively high temperatures and a range of semi-metallic properties, including high emittance, within a temperature range below relatively high temperatures, and the particles are dimensioned such that the particles retain the semi-metallic properties at relatively high temperatures, but would otherwise transition to a range of metallic properties if not spatially isolated and appropriately dimensioned; and a separator for maintaining spatial isolation of the particles.

In some embodiments the transition metal based complex includes at least one transition metal chemically bonded such that there is energy splitting of the d-orbitals resulting in: (1) relatively empty $e_g$-orbitals at low temperatures, which in turn results in the complex having non-metallic characteristics at low temperatures; (2) the promotion of electrons from filled d-orbitals into the $e_g$-orbitals at higher temperatures, which in turn results in the complex having semi-metallic characteristics at high temperatures; and, (3) a switching temperature $T_s$ at which the complex transitions from having non-metallic characteristics to semi-metallic characteristics.

In some embodiments the transition metal is one of Tungsten (W), Manganese (Mn), Lanthanum (La) and Vanadium (V). In some embodiments the transition metal is bonded with an oxide $(O_n)$ group. In some very specific embodiments, the complex is a Vanadium Oxide $(VO_n)$.

In some embodiments the variable emittance thermochromic material also includes a dopant for changing the switching temperature $T_s$. Accordingly, in some embodiments the dopant is a donor of electrons and in other embodiments the dopant is an acceptor of electrons. As a result in various embodiments, the switching temperature ranges over the approximate range of −20° C. to +68° C.

In some embodiments the variable emittance thermochromic material also includes a dielectric matrix separating the particles. In some very specific embodiments the dielectric matrix comprising Silicon Dioxide $(SiO_2)$.

According to another aspect of an embodiment of the invention there is provided a variable emittance thermochromic device: a substrate; at least one layer of spatially isolated particles applied over the substrate, wherein the particles are of a transition metal based complex having temperature dependent properties including a range of non-metallic properties at relatively low temperatures, a range of metallic properties at relatively high temperatures and a range of semi-metallic properties, including high emittance, within a temperature range below relatively high temperatures, and the particles are dimensioned such that the particles retain the semi-metallic properties at relatively high temperatures, but would otherwise transition to a range of metallic properties if not spatially isolated and appropriately dimensioned.

In some embodiments the variable emittance thermochromic device also includes: a plurality of layers of spatially isolated particles; and, a plurality of buffer layers interleaved between spatially isolated particle layers; wherein each of the plurality of layers of spatially isolated particles is separated from another one of the plurality of layers of spatially isolated particles by at least one of the buffer layers. In some embodiments at least one of the buffer layers is patterned. In some embodiments at least a portion of the substrate is patterned. In some embodiments the spatially isolated particles are separated by textured features on the substrate.

According to another aspect of an embodiment of the invention there is provided a communication system including: at least one terrestrial transceiver for at least one of receiving and transmitting signals; and, a satellite including: a satellite transceiver, for at least one of receiving from and transmitting signals to the terrestrial transceiver, the satellite transceiver designed for operating effectively within a temperature range, and wherein outside the temperature range the satellite transceiver may operate less effectively and is subject to temperature-based failure; a housing for shielding the satellite transceiver and providing an internal environment in which an operating temperature range for the satellite transceiver is maintained so that the satellite transceiver operates effectively; and, a variable emittance thermochromic device, located on the housing and helping to maintain the operating temperature range within the internal environment provided by the housing, the variable emittance thermochromic device including at least one layer of spatially isolated particles, wherein the particles are of a transition metal based complex having temperature dependent properties including a range of non-metallic properties at relatively low temperatures including low emittance, a range of metallic properties at relatively high temperatures and a range of semi-metallic properties, including high emittance, within a temperature range below relatively high temperatures, and the particles are dimensioned such that the particles retain the semi-metallic properties at relatively high temperatures, but would otherwise transition to a range of metallic properties if not spatially isolated and appropriately dimensioned; and a separator for maintaining spatial isolation of the particles.

In some embodiments the communication system also includes a terrestrial network including the terrestrial transceiver and at least one other communication device for transmitting to or receiving signals from the terrestrial transceiver.

Other aspects and features of the present invention will become apparent, to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings, which illustrate aspects of the present invention and in which.

DETAILED DESCRIPTION OF THE INVENTION

Known methods of thermal control can be categorized as either active or passive. Often passive thermal control includes the application of a thermal control coating with a fixed thermal emissivity value that is selected as a tradeoff between efficient heat dissipation at high temperatures and sufficient heat retention at low temperatures. Alternatively, active thermal management systems include some combination of electro-mechanical systems, heating and cooling pipes and/or voltage controlled variable emittance panels applied over thermal radiators. There are a number of problems associated with active thermal management systems including cost, complexity, size, weight, redundancy and the risk of catastrophic damage.

The emittance value is a measure of an amount of energy expelled from a given surface area relative to a black-body reference. Depending on the specific coating a change in the emittance value is actively or passively effected. There are known active variable emittance thermal control coatings. However, such coatings are actually panels housing a mixture of both high and low emissivity materials that are electrically manipulated to control the emittance value of the panel. These "coatings" are classified as either electrochromic or electrophorectic. Both electrochromic and electrophorectic coatings require an applied voltage to cause a change in the emittance value of the coating.

By contrast, aspects of the present invention do not include active variable emittance thermal control coatings. Aspects of the present invention do include passive variable emittance thermal control coatings and materials. In accordance with aspects of the present invention "passive" means that the variable emittance value changes in response to changes in the environment without active control (e.g. a voltage is not applied).

That is, in contrast to both passive and active thermal control techniques previously employed, aspects of the present invention provide a passive thermal control material having a variable emittance that changes in response to changes in temperature. More specifically, in accordance with one aspect of the invention a passive variable emittance thermochromic material is provided that has a relatively low emittance value at low temperatures and a relatively high emittance value at high temperatures.

In other embodiments the passive variable emittance thermochromic material is integrated with a substrate to produce a passive variable emittance thermochromic device that can be used to create a structure or housing or that can be applied over an existing structure or housing. In even more specific embodiments, the passive variable emittance thermochromic material is integrated onto the housing of a satellite, within a satellite system, to help maintain the operating environment of a satellite transceiver and other electronics and thereby improve signal quality of the signals transmitted and received from and by the satellite. Additionally and/or alternatively, the passive variable emittance thermochromic material may be employed in a number of terrestrial situations for regulating the internal temperature of a structure, housing, protective suite, and/or vehicle.

In some embodiments the passive variable emittance thermochromic material is provided in the form of a coating that is deposited on a surface or substrate. Consequently, the thermal control coating can be used to regulate the amount of heat energy that is absorbed into and/or expelled away from a surface. For example, if a thermal control coating is applied to the windows of a building, the thermal control coating will help to regulate the internal temperature of the building. In another example a thermal coating may be applied to an astronaut space suit to help to regulate its internal temperature. Similarly, a thermal control coating can be applied to the body surfaces of a satellite to protect the internal electronics from extreme temperature variations (e.g. −150° C. to +150° C.) that occur in space.

In accordance with some aspects of the invention a passive variable emittance thermochromic material includes a transition metal that is characterized by partially filled d-orbitals that contribute to metallic bonding. Examples of such transition metal include Tungsten (W), Manganese (Mn), Lanthanum (La) and Vanadium (V). As will be described further below with reference to FIG. 4, chemical bonding of such a transition metal can produce energy splitting of the d-orbitals into a higher energy $e_g$-orbital pair and a lower energy $t_{2g}$-orbital triplet. Then, as a function of temperature and construction of the passive variable emittance thermochromic material, electrons in the resulting complex occupy some combination of the $e_g$-orbital pair and the lower energy $t_{2g}$-orbital triplet causing the complex to exhibit non-metallic characteristics at lower temperatures and semi-metallic characteristics at higher temperatures.

Vanadium Oxides ($VO_n$) exhibit one of the largest observed variations in electrical and optical characteristics due to an insulator-metal transition caused by a change in temperature. The temperature at which a insulator-metal transition occurs is termed the transition temperature ($T_s$). In vanadium oxides the transition temperature is dependent on the oxygen content in the vanadium oxide. As examples, the corresponding transition temperatures for VO, $V_2O_3$, and $VO_2$ are −147° C., −133° C. and +68° C., respectively. Additionally and/or alternatively, a vanadium oxide can be doped with suitable donors and acceptors to change the transition temperature to a new value above or below the transition temperature of the vanadium oxide alone. Dopants such as tungsten and manganese, provide extra electrons and thereby act as donors. Dopants such as titanium, with fewer valence electrons act as acceptors.

Figure 1:
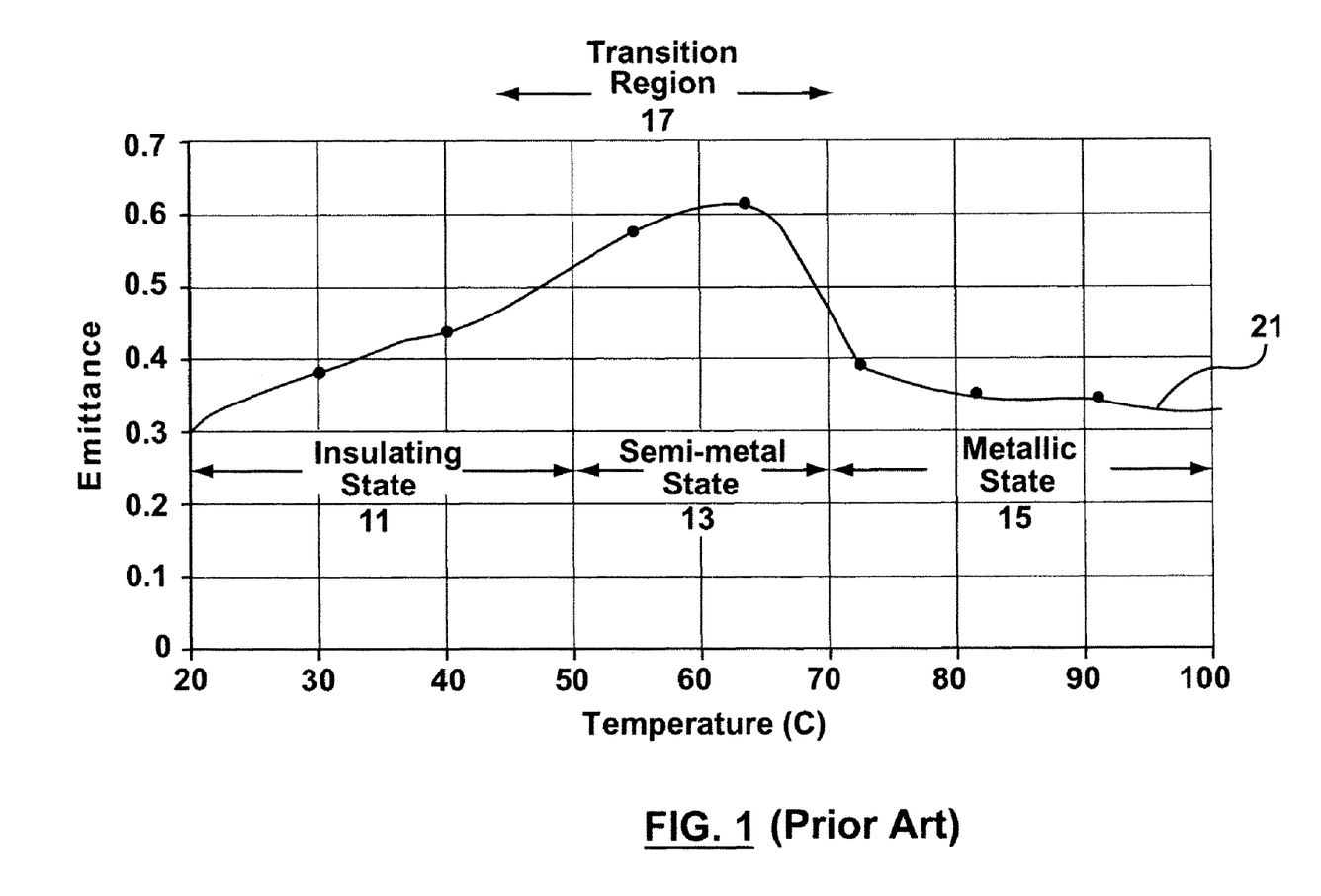
FIG. 1 is an illustration showing measured emittance as a function of temperature for a smooth Vanadium Oxide ($VO_n$) coating deposited onto a layer of Aluminum (Al)

However, the problem with vanadium oxides is that while they each have a respective transition temperature $T_s$, at which the complex changes from exhibiting non-metallic characteristics to exhibiting metallic characteristics, the emittance value is relatively the same at both high and low temperatures. The only temperature range in which the emittance value of vanadium oxides is high is within a semi-metallic region that occurs at and around the transition temperature. FIG. 1 is an illustration showing measured emittance 21 as a function of temperature for a smooth Vanadium Oxide ($VO_n$) coating deposited onto a layer of aluminum in accordance with the disclosure of U.S. Pat. No. 6,440,592 to Meyer et al. The emittance value of the coating disclosed by Meyer is more or less the same at temperatures below the transition temperature $T_s$ as the emittance value at temperatures above the transition temperature $T_s$. The initial emittance, at the temperature below the transition temperature $T_s$=68° C. is $\in$=0.37 in the insulating state 11. The value of the emittance increases to above 0.62 in the transition region 17 around the transition temperature $T_s$, which also defines the semi-metallic state for the vanadium oxide $VO_2$. Once there is a complete transition to the $VO_2$ metallic state 15, the emittance value decreases to about 0.35. Therefore, such a device would not be acceptable for a variable emittance thermal radiator, where higher emittance is required at higher temperatures, and lower emittance is needed at lower temperatures.

In contrast to the smooth vanadium oxide coating disclosed by Meyer et al, aspects of the present invention provide a passive variable emittance thermochromic material that has a low emittance value at low temperatures and maintains a high emittance value at high temperatures. In one specific embodiment including the use of a vanadium oxide, the maintenance of the high emittance value at high temperatures is accomplished by suppressing the transition of the vanadium oxide to a full metallic state, and instead maintaining the vanadium oxide in a semi-metallic state at high temperatures, by spatially isolating appropriately sized particles of vanadium oxide.

More specifically, aspects of the present invention provide a nano-engineered single or multi-layered vanadium oxide material including a suitable combination of planar and vertical vanadium oxide particles (i.e. spatially isolated particles) that suppress a full metal transition in the vanadium oxide and induce an artificial semi-metallic state having a high emittance value at high temperatures. In accordance with aspects of the invention, as the size of the vanadium oxide particles is reduced, the energy gap between the higher energy $e_g$-orbital pair and a lower energy $t_{2g}$-orbital triplet increases, resulting in the formation of an energy band gap due to dimensional localization. Thus, it is possible to induce the transition from the low temperature, low emittance insulator state to a high emittance, semi-metallic state by varying the size and distribution of the vanadium oxide particles.

Additionally and/or alternatively, the vanadium oxide particles can be doped to adjust the transition temperature of the passive variable emittance thermochromic material. Additionally and/or alternatively, the vanadium oxide particles can be provided in combination with a dielectric matrix.

Figure 2:
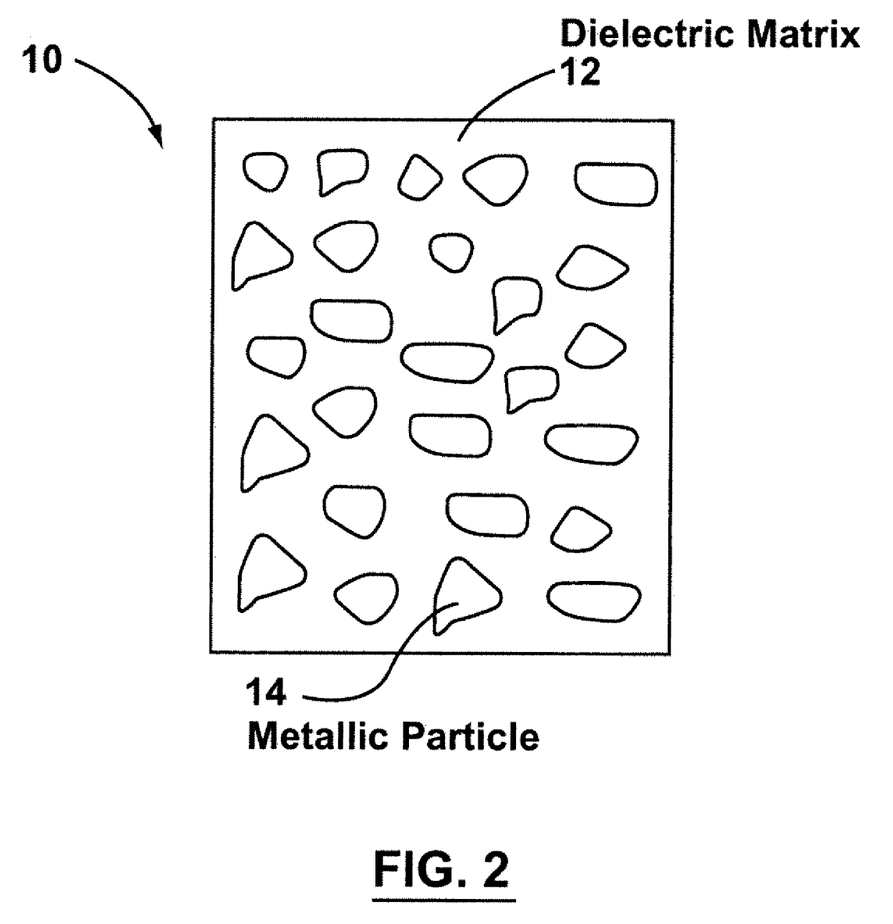
FIG. 2 is a schematic illustration of a sample of a passive variable emittance thermochromic material in accordance with an aspect of the invention.

Referring to FIG. 2, shown is a schematic illustration of a sample of a passive variable emittance thermochromic material 10 in accordance with some specific aspects of the invention described. The variable emittance thermochromic material 10 includes a dielectric matrix 12 and spatially isolated particles 14 dispersed in the dielectric matrix 12. In some embodiments, the dielectric matrix 12 is composed of Silicon Dioxide ($SiO_2$). However, other dielectric materials may also be used. In this particular embodiment, the spatially isolated particles 14 are a complex of crystalline Vanadium Oxide ($VO_2$).

As noted previously, the vanadium oxide $VO_2$, has a transition temperature $T_s$ of +68° C. that defines the insulator-metal characteristic transition point. Referring again to FIG. 1, below the transition temperature $T_s$ vanadium oxide exhibits its insulator (i.e. non-metallic) characteristics. Above the transition temperature $T_s$ vanadium oxide exhibits conductive metal characteristics.

Further vanadium oxide $VO_2$ is a semiconductor that can be doped with suitable donors and acceptors to tailor the material characteristic profile. More specifically, by doping vanadium oxide it is possible to shift the transition temperature from +68° C. down to below −20° C., as may be required for a given application.

Figure 3:
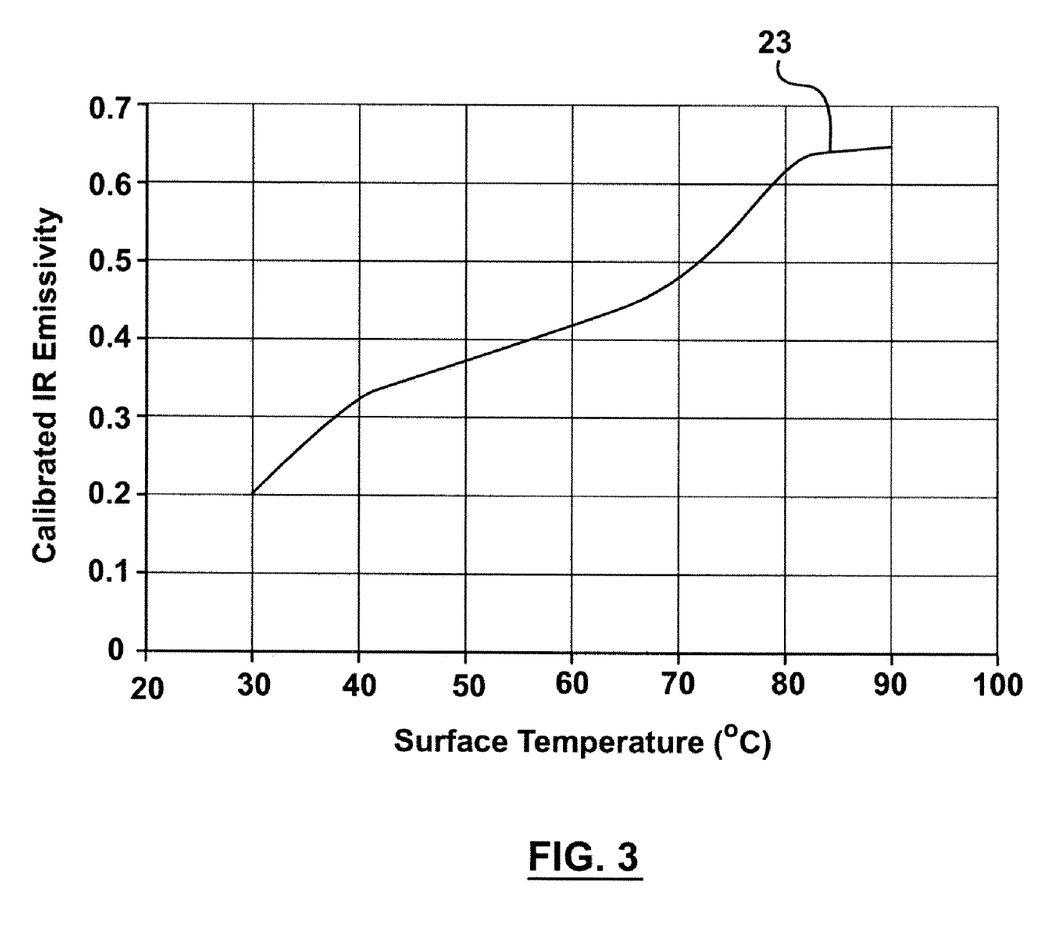
FIG. 3 is an illustration showing measured emittance as a function of temperature for the passive variable emittance thermochromic material schematically illustrated in FIG. 2.

However, in contrast to the smooth vanadium oxide coating disclosed by Meyer, the emittance value of the passive variable emittance thermochromic material 10 rises as the temperature rises and does not fall again as the temperature continues to rise. This is illustrated in FIG. 3, which shows the measured emittance 23 as a function of temperature for the variable emittance thermochromic material schematically illustrated in FIG. 2.

The material provided by aspects of the present invention is based on nano-engineered single-layer or multi-layered vanadium oxide material. The nano-engineered material, shown in FIG. 2, prevents the vanadium oxide from undergoing a full transition into the metallic state by suspending vanadium oxide particles 14 in the dielectric matrix 12, instead of providing the vanadium oxide in a homogenous and contiguous layer as is disclosed by Meyer et al. As a result, an intermediate semi-metallic state is induced that provides high emittance as the temperature rises. With specific reference to FIG. 3, the emittance value 23 varies from below 0.20 in the insulating state at lower temperatures to above 0.65 above the transition temperature in the semi-metallic state.

Figure 4:
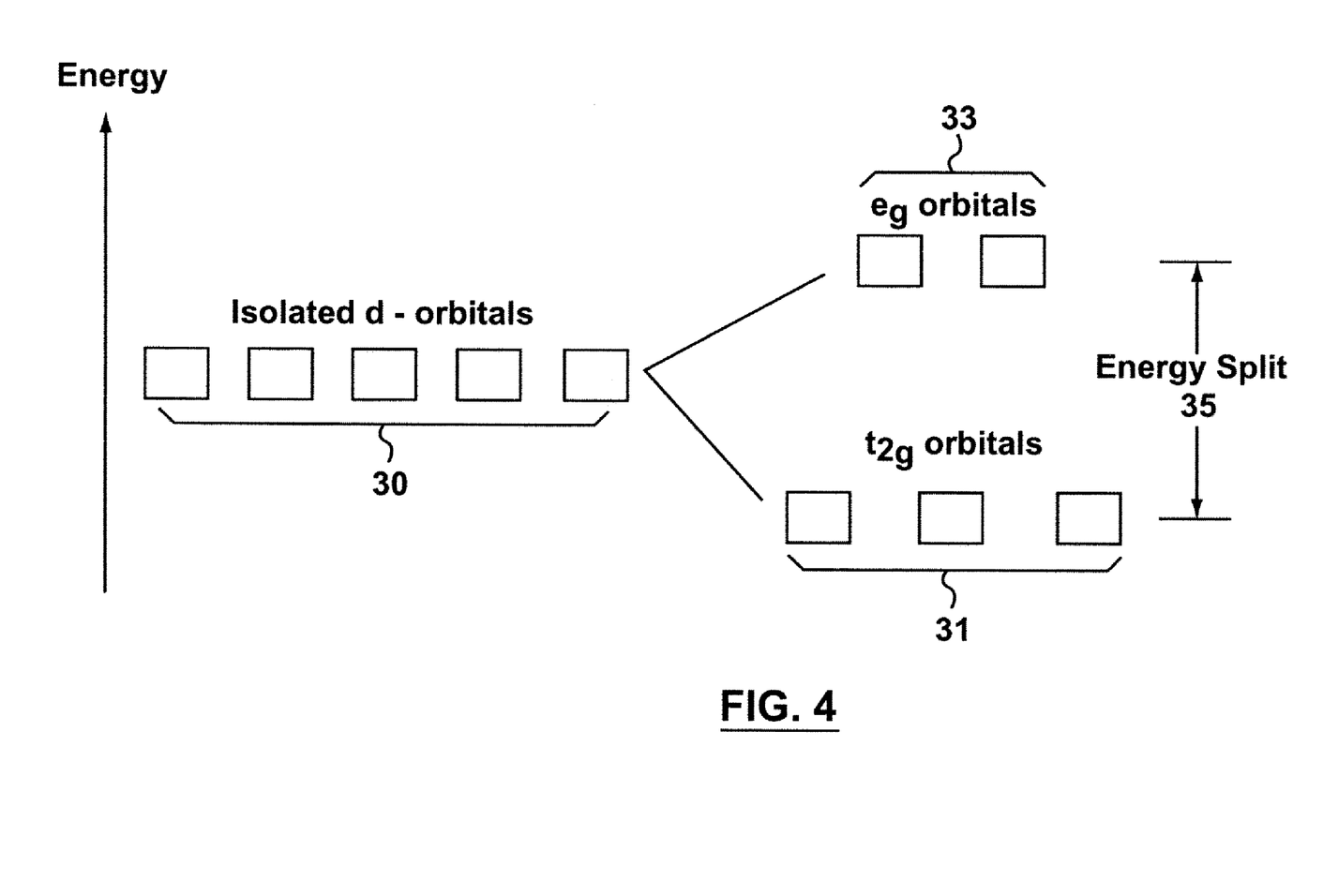
FIG. 4 is an schematic illustration showing energy splitting of vanadium d-orbitals in accordance with aspects of the invention.

FIG. 4 is a schematic illustration showing energy splitting of vanadium d-orbitals 30 into a higher energy $e_g$-orbital pair 33 and a lower energy $t_{2g}$-orbital triplet 31. The difference in energy levels between the higher energy $e_g$-orbital pair 33 and the lower energy $t_{2g}$-orbital triplet 31 is generally indicated by 35. As a function of temperature and construction of the passive variable emittance thermochromic material, electrons in the resulting complex occupy some combination of the $e_g$-orbital pair 33 or lower energy $t_{2g}$-orbital triplet 31 causing the complex to exhibit non-metallic characteristics at lower temperatures and semi-metallic characteristics at higher temperatures. It is possible to induce the transition from the low temperature, low emittance insulator state to a high emittance, semi-metallic state by varying the size and distribution of the vanadium oxide particles. Generally, as the size of the vanadium oxide particles is reduced, the energy gap 35 between the higher energy $e_g$-orbital pair 33 and a lower energy $t_{2g}$-orbital triplet 31 increases, resulting in the formation of an increased energy band gap 35 due to dimensional localization.

There are various ways in which the passive variable emittance thermochromic material may be configured and utilized. In some embodiments the material is provided as a single layer containing the spatially isolated particles and the dielectric matrix, whereas in other embodiments a multi-layered material is provided. Additionally and/or alternatively, the passive variable emittance thermochromic material is either deposited or integrated onto a substrate producing a corresponding passive variable emittance thermochromic device. FIGS. 5A to 5E illustrate examples of various devices provided in accordance with aspects of the invention.

Figure 5A:
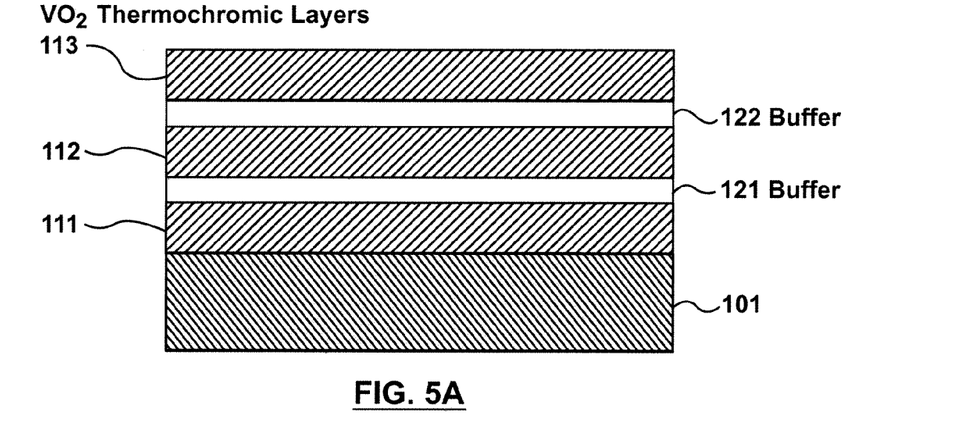
FIG. 5A is a cross-sectional view of a first passive variable emittance thermochromic device in accordance with aspects of the invention.

Referring specifically to FIG. 5A, shown is a cross-sectional view of a first passive variable emittance thermochromic device 120a in accordance with aspects of the invention. The first passive variable emittance thermochromic device 120a includes a substrate 101 (e.g. aluminum, stainless steel, ceramic tiles, polymer, etc.) and a number of layers of a passive variable emittance thermochromic material 111, 112 and 113 provided in accordance with aspects of the invention. The first layer 111 is provided directly above the substrate 101, and buffer layers 121 and 122 are also provided between layers 111 and 112 and layers 112 and 113, respectively.

Figure 5B:
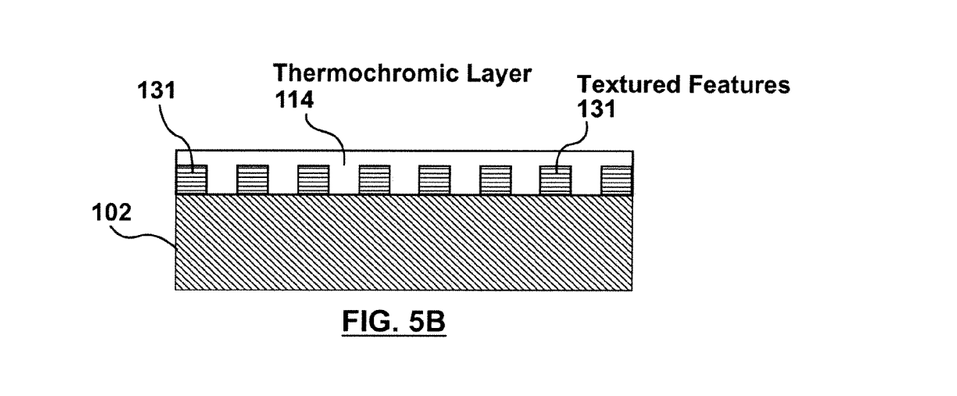
FIG. 5B is a cross-sectional view of a second passive variable emittance thermochromic device in accordance with aspects of the invention.

Referring specifically to FIG. 5B, shown is a cross-sectional view of a second passive variable emittance thermochromic device 120b in accordance with aspects of the invention. The second passive variable emittance thermochromic device 120b includes a substrate 102 that has been patterned. As such, the substrate 102 includes textured features 131 that are produced by techniques such as etching and sandblasting. This second passive variable emittance thermochromic device 120b also includes a layer of the passive variable emittance thermochromic material 114 described above. The pattern substrate 102, with the textured features 131 helps to hold the layer of the passive variable emittance thermochromic material 114 in place and permits the layer of the passive variable emittance thermochromic material 114 to be thicker than would otherwise be possible.

Figure 5C:
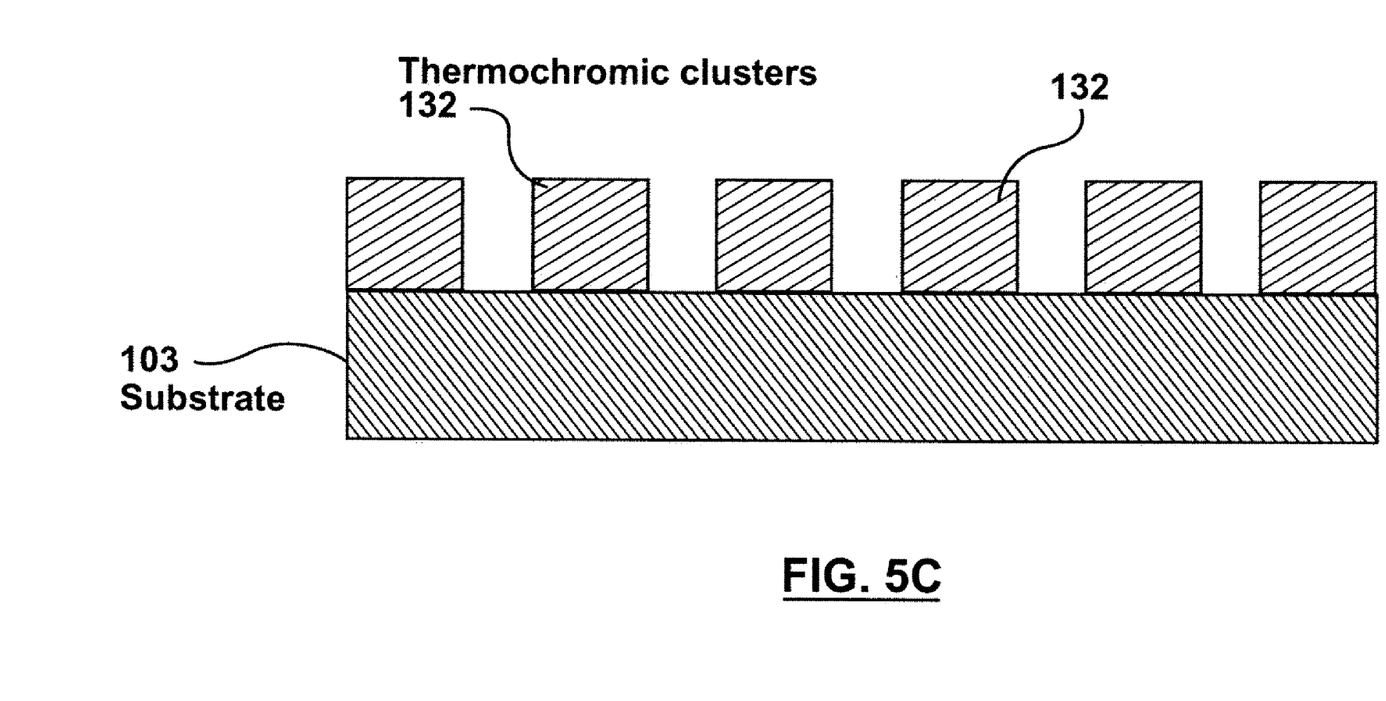
FIG. 5C is a cross-sectional view of a third passive variable emittance thermochromic device in accordance with aspects of the invention.

FIG. 5C shows a cross-sectional view of a third passive variable emittance thermochromic device 120c in accordance with aspects of the invention. The third passive variable emittance thermochromic device 120c includes a substrate 103 and a layer of the passive variable emittance thermochromic material applied as a number of clusters 132 on the surface of the substrate 103. The clusters 132 can be further sealed against the substrate 103 for their protection using a non-reactive clear polymer coating (not shown).

Figure 5D:
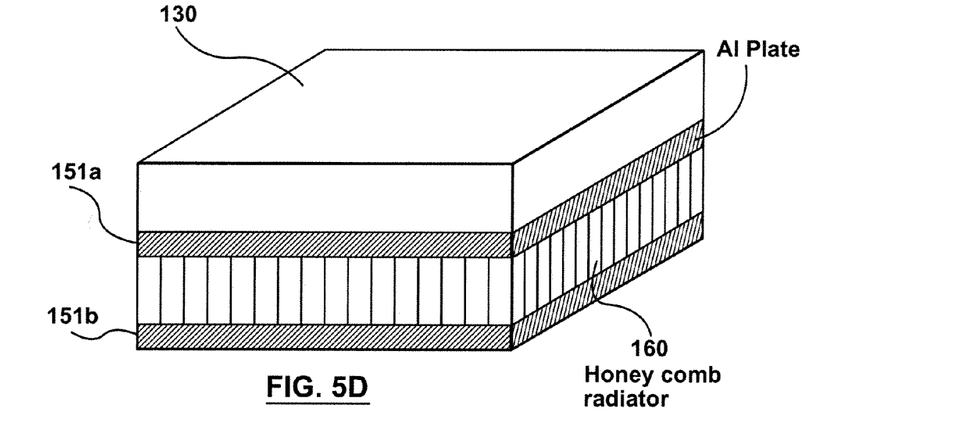
FIG. 5D is a perspective view of a fourth passive variable emittance thermochromic device in accordance with aspects of the invention.

FIG. 5D shows a perspective view of a fourth passive variable emittance thermochromic device 120d in accordance with aspects of the invention. The fourth passive variable emittance thermochromic device 120d includes a layer of the passive variable emittance thermochromic material 130 applied over a thermal radiator. The thermal radiator includes a honeycomb structure 160 sandwiched between two substrate layers 151a and 151b.

Figure 5E:
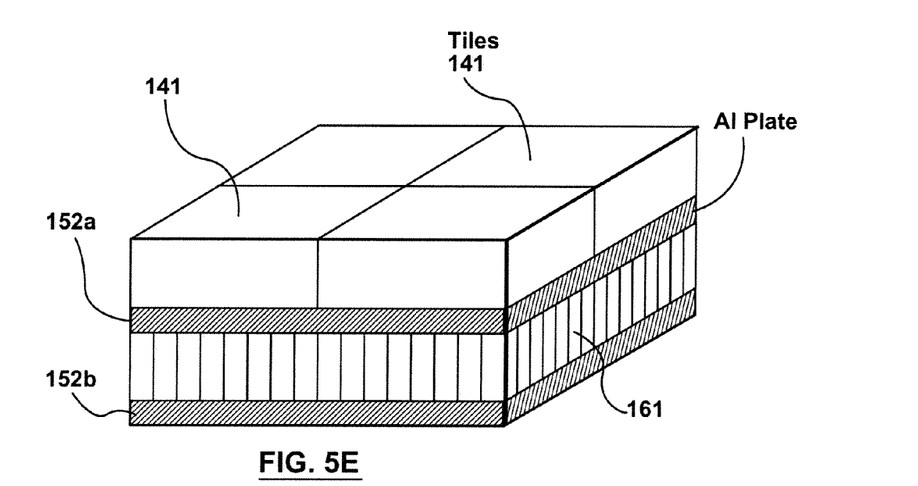
FIG. 5E is a perspective view of a fifth passive variable emittance thermochromic device in accordance with aspects of the invention.

The fifth passive variable emittance thermochromic device 120e, shown in FIG. 5E, is similar to the fourth passive variable emittance thermochromic device 120d shown in FIG. 5D. Again, included are a honeycomb structure 161 sandwiched between two substrate layers 152a and 152b. However, in this device the passive variable emittance thermochromic material is provided as a number of tiles 141.

The devices 120a, 120b, 120c, 120d, 120e, shown in FIGS. 5A-5E can be constructed using a number of manufacturing techniques known to those skilled in the art. For example, the use of Laser Ablation Deposition (LAD) can be used. LAD is a deposition process in which material deposition is caused by an intense optical beam. A laser beam produces a plume that is a plasma-like substance including molecular fragments, neutral particles, free electrons, ions and chemical reaction products. Control of the plume is used to realize and control the growth rate of a given material on a prepared substrate. During LAD a laser ejects target atoms that are then free to combine with reactive gases, such as oxygen, to form a complex that is fixedly deposited on the substrate. Those skilled in the art will appreciate that other techniques such as chemical vapor deposition, wet and dry etching, lithography and sandblasting may also be used to form the devices illustrated in FIGS. 5A to 5E.

Figure 6:
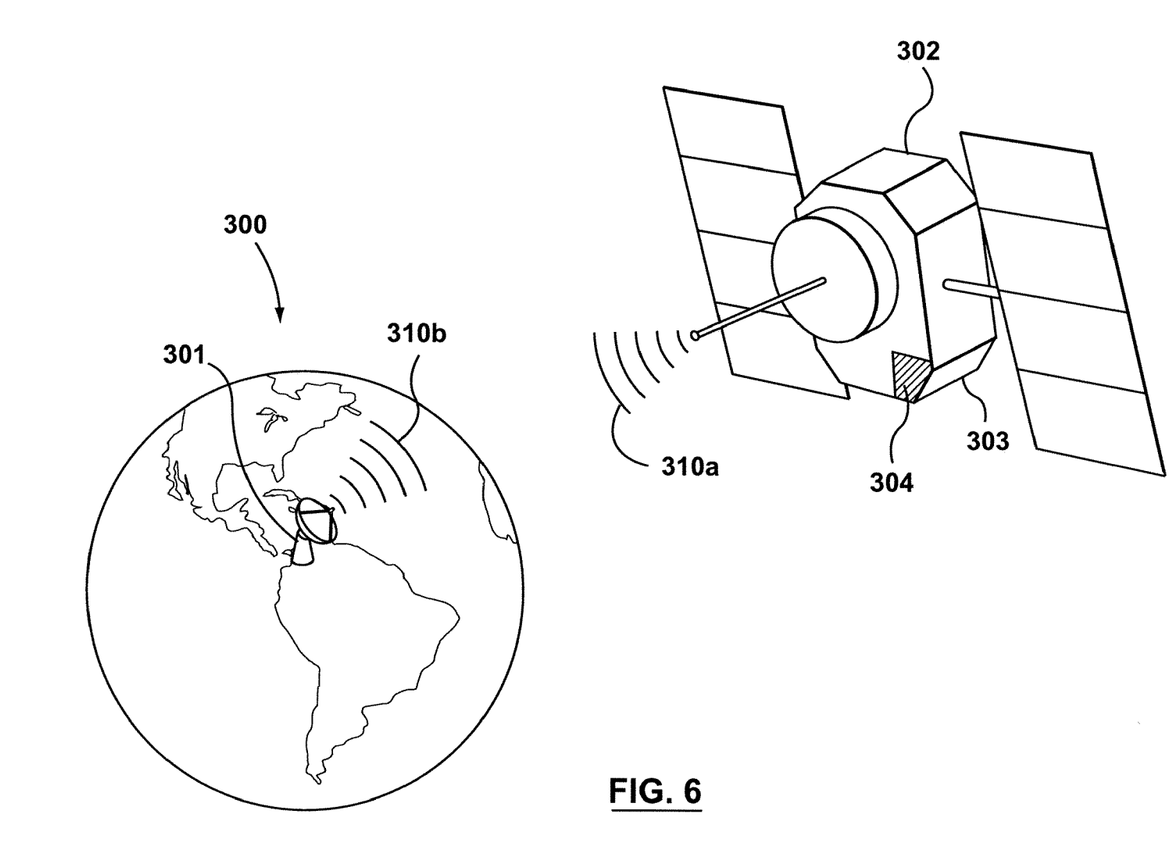
FIG. 6 is a schematic illustration of a satellite system incorporating a passive variable emittance thermochromic device in accordance with aspects of the invention.

FIG. 6 is a schematic illustration of a satellite system 300 incorporating a variable emittance thermochromic device in accordance with aspects of the invention. The satellite system 300 includes at least one terrestrial transceiver 301 for at least one of receiving and transmitting signals 310b and a satellite 302. The satellite 302 includes a satellite transceiver (not specifically shown), for at least one of receiving from and transmitting signals to the terrestrial transceiver 301. The satellite transceiver designed for operating effectively within a temperature range, and wherein outside the temperature range the satellite transceiver may operate less effectively and is subject to temperature-based failure. The satellite 302 also includes a housing 303 for shielding the satellite transceiver and providing an internal environment in which an operating temperature range for the satellite transceiver is maintained so that the satellite transceiver operates effectively. Further, the satellite 302 includes a variable emittance thermochromic device 304, located on the housing 303 that is provided to help maintain the operating temperature range within the internal environment provided by the housing 303. The variable emittance thermochromic device 304 includes at least one layer of spatially isolated particles, wherein the particles are of a transition metal based complex having temperature dependent properties including a range of non-metallic properties at relatively low temperatures, a range of metallic properties at relatively high temperatures and a range of semi-metallic properties, including high emittance, within a temperature range below relatively high temperatures, and the particles are dimensioned such that the particles retain the semi-metallic properties at relatively high temperatures, but would otherwise transition to a range of metallic properties if not spatially isolated and appropriately dimensioned.

The satellite system can be further expanded to include communication devices such as mobile phones, mobile email devices, radios and the like that receive signal that are routed through the satellite 302. The operation of these devices may benefit from the passive variable emittance thermochromic material described herein by the fact that signal quality of the signals transmitted to or from the satellite 302 is not depreciated to much as a result of extreme temperature changes within the satellite transceiver.

While the above description provides example embodiments, it will be appreciated that the present invention is susceptible to modification and change without departing from the fair meaning and scope of the accompanying claims. Accordingly, what has been described is merely illustrative of the application of aspects of embodiments of the invention and numerous modifications and variations of the present invention are possible in light of the above teachings.

We claim:

1. A communication system comprising:
   at least one terrestrial transceiver for at least one of receiving and transmitting signals; and
   a satellite including:
   a satellite transceiver, for at least one of receiving from and transmitting signals to the terrestrial transceiver, the satellite transceiver designed for operating effectively within a temperature range, and wherein outside the temperature range the satellite transceiver may operate less effectively and is subject to temperature-based failure;
   a housing for shielding the satellite transceiver and providing an internal environment in which an operating temperature range for the satellite transceiver is maintained so that the satellite transceiver operates effectively; and
   a variable emittance thermochromic material, located on the housing and helping to maintain the operating temperature range within the internal environment provided by the housing, the variable emittance thermochromic material including at least one layer of spatially isolated particles, wherein the particles are of a transition metal based complex having temperature dependent properties including a range of non-metallic properties at relatively low temperatures including low emittance, a range of metallic properties at relatively high temperatures and a range of semi-metallic properties, including high emittance, within a temperature range below relatively high temperatures, and the particles are dimensioned such that the particles retain the semi-metallic properties at relatively high temperatures, but would otherwise transition to a range of metallic properties if not spatially isolated and appropriately dimensioned; and
   a separator for maintaining spatial isolation of the particles.

2. A communication system according to claim 1, wherein the transition metal based complex includes at least one transition metal chemically bonded such that there is energy splitting of the d-orbitals resulting in:
   (1) relatively empty $e_g$-orbitals at low temperatures, which in turn results in the complex having non-metallic characteristics at low temperatures;
   (2) the promotion of electrons from filled d-orbitals into the $e_g$-orbitals at higher temperatures, which in turn results in the complex having semi-metallic characteristics at high temperatures; and
   (3) a switching temperature $T_s$ at which the complex transitions from having non-metallic characteristics to semi-metallic characteristics.

3. A communication system according to claim 2, wherein the transition metal is one of Tungsten (W), Manganese (Mn), Lanthanum (La) and Vanadium (V).

4. A communication system according to claim 2, wherein the transition metal is bonded with an oxide ($O_n$) group.

5. A communication system according to claim 1, wherein the complex is a Vanadium Oxide ($VO_n$).

6. A communication system according to claim 1 further comprising a dopant for changing the switching temperature $T_s$.

7. A communication system according to claim 6, wherein the dopant is a donor of electrons.

8. A communication system according to claim 6, wherein the dopant is an acceptor donor of electrons.

9. A communication system according to claim 6, wherein the switching temperature ranges over the approximate range of $-20°$ C. to $+68°$ C.

10. A communication system according to claim 1 wherein the separator comprises a dielectric matrix separating the particles.

11. A communication system according to claim 10, wherein the dielectric matrix comprising Silicon Dioxide ($SiO_2$).

12. A communication system according to claim 1 wherein the separator comprises some portion of a substrate material onto when the spatially isolated particles are deposited.

13. A communication system according to claim 12, wherein the portion of the substrate material is patterned.

14. A communication system according to claim 12, wherein the portion of the substrate is a metal oxide layer.

15. A communication system according to claim 12 further comprising:
    a plurality of layers of spatially isolated particles; and
    a plurality of buffer layers interleaved between spatially isolated particle layers;
    wherein each of the plurality of layers of spatially isolated particles is separated from another one of the plurality of layers of spatially isolated particles by at least one of the buffer layers.

16. A communication system according to claim 15, wherein at least one of the buffer layers is patterned.

17. A communication system according to claim 15, wherein at least a portion of the substrate is patterned.

18. A communication system according to claim 12, wherein the spatially isolated particles are separated by textured features on the substrate.

19. A communication system according to claim 1 further comprising a terrestrial network including the terrestrial transceiver and at least one other communication device for transmitting to or receiving signals from the terrestrial transceiver.

* * * * *